United States Patent
Heistermann et al.

(10) Patent No.: US 6,477,701 B1
(45) Date of Patent: Nov. 5, 2002

(54) VERSION-ADAPTIVE SERIALIZATION AND DESERIALIZATION OF PROGRAM OBJECTS IN AN OBJECT-ORIENTED ENVIRONMENT

(75) Inventors: Horst Heistermann, Sunnyvale, CA (US); Chia-Hsin Li, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/410,363

(22) Filed: Sep. 30, 1999

(51) Int. Cl.$^7$ ................................................ G06F 9/44
(52) U.S. Cl. ...................... 717/108; 717/108; 717/122; 707/203
(58) Field of Search ................................ 717/108, 116, 717/170, 148, 120, 122, 100, 101, 118; 707/203, 513, 500

(56) References Cited

U.S. PATENT DOCUMENTS

| | | | | |
|---|---|---|---|---|
| 5,867,708 A | * | 2/1999 | Copeland et al. | 717/108 |
| 6,032,152 A | * | 2/2000 | Pearson | 707/103 |
| 6,085,198 A | * | 7/2000 | Skinner et al. | 707/103 |
| 6,151,700 A | * | 11/2000 | Fox | 717/107 |
| 6,212,673 B1 | * | 4/2001 | House et al. | 717/100 |
| 6,256,771 B1 | * | 7/2001 | O'Neil et al. | 717/100 |
| 6,272,521 B1 | * | 8/2001 | Jablonski et al. | 709/200 |
| 6,272,677 B1 | * | 8/2001 | Lam et al. | 717/170 |
| 6,292,933 B1 | * | 8/2001 | Bahrs et al. | 717/107 |
| 6,298,353 B1 | * | 10/2001 | Apte | 707/103 |
| 6,298,478 B1 | * | 10/2001 | Nally et al. | 717/170 |
| 6,301,585 B1 | * | 10/2001 | Milne | 707/103 |
| 6,385,769 B1 | * | 5/2002 | Lewallen | 717/125 |

OTHER PUBLICATIONS

Opyrchal et al, "Efficient object serialization in Java", IEEE, Dist. Computing Workshop, pp. 96–101, 1999.*
Breg et al, "Java virtual machine support for object serialization" ACM Java Grande/ISCOPE, pp. 173–180, 2001.*
Wiebe, "A distributed repository for immutable persistent objects", ACM OOPSLA, pp. 453–465, 1986.*
Braux et al, "Towards partially evalating reflection in Java", ACM PEPM, pp. 2–11, 2000.*

\* cited by examiner

*Primary Examiner*—Anil Khatri

(57) ABSTRACT

Known techniques for generating serial information to represent program objects (serialization) and to recreate program objects from the serial information (deserialization) often impose limitations on the changes that may be made to the class structure or definition of the program object. Many changes to the class structure introduce incompatibilities that prevent a one version of a program object from being recovered from serial information that represent a different version of the program object. Techniques are disclosed that overcome this difficulty by allowing the serialization and deserialization processes to be adaptive according to the version of the program object.

52 Claims, 7 Drawing Sheets

VERSION-ADAPTIVE SERIALIZATION AND DESERIALIZATION OF PROGRAM OBJECTS IN AN OBJECT-ORIENTED ENVIRONMENT

TECHNICAL FIELD

The present invention pertains generally to computer programs, and pertains more particularly to techniques for handling program objects in object-oriented programming.

BACKGROUND ART

In applications implemented by objected-oriented programming, elements of the application may be represented by programming structures known as program objects. A program object may represent essentially any real or imaginary, tangible or intangible item. For example, in a payroll system, an object may be used to represent an employee or an employee's pay for a designated period of employment. In an aircraft landing control system, a program object may be used to represent individual aircraft or a particular runway. In this same system, a program object representing an entire airport could represent the control tower and also include or embed program objects representing all the runways for that airport.

Program objects normally do not survive beyond the execution lifetime of the program that creates them. The information that represents the objects normally resides in some form of volatile storage such as random access memory (RAM) and the ability to access and use this information normally exists only while the program that created the program objects is executing.

Known techniques allow an executing program to generate information that represents a program object in a form that can be recorded or transmitted, and that permit a program executing at another time or place to read the information and recreate the program object. Suitable techniques for program objects in the Java™ programming language are disclosed in an "Object Serialization Specification" published by Sun Microsystems, Inc. of Palo Alto, Calif. This specification is available from the Internet under a "jdk-specification directory" identified by the Uniform Resource Locator (URL) http://java.sun.com/products/jdk/1.1/docs/guide/serialization/spec/. Under this jdk-specification directory, a table of contents for this specification is identified by "serialTOC.doc.html" and a discussion of system architecture is identified by "serial-arch.doc.html". Additional information is available from articles published in JavaWorld by Web Publishing Inc. These articles are available from the Internet in subdirectories under a "javaworld directory" identified by the URL http://wwwjavaworld.com/javaworld/. The subdirectories and names for two relevant articles under the javaworld base directory are jw-01-1998/jw-01-beans_p.html and jw-02-1998/jw-02-beans_p.html. The term "object serialization" refers to the process of generating a serial stream of information that represents a program object and the term "object deserialization" refers to the process of reading the serial stream of information and recreating the program object.

Object serialization and deserialization can be used to optimize the processing required for one or more applications. For example, application processing can be split into segments and the processing required to perform those segments can be provided by two or more computing systems. One computer system could perform an initial segment of an application and, at the conclusion of that segment, serialize one or more program objects to capture the state of the processing in a serial information stream. A second computer system could continue application processing by recreating the program objects represented by the serial information stream, thereby restoring the state of the processing that existed in the first computer system at the end of the initial segment, and continuing the processing by performing a subsequent segment. Alternatively, serialized information could be provided to multiple computer systems for performing the same segment of the process more or less in parallel.

Unfortunately, known techniques for serializing and deserializing program objects impose significant restrictions on the changes that can be made to the programs used to perform an application. Changes that correct errors or add new features to an application may require corresponding changes in one or more defined structures of program objects. Each change to the definition of a program object is said to introduce a new "version" of the program object. More precisely, such changes introduce a new version of the "class" that defines the structure of a program object. A program object is an instance of the class that defines its structure.

A change may be forward compatible in the sense that a program using a later version of a class can successfully deserialize an instance of that class from serial information that was generated by a program using an earlier version of the class. A change may backward compatible in the sense that a program using an earlier version of a class can successfully deserialize an instance of that class from serial information that was generated by a program using a later version of the class. A compatible change is both forward and backward compatible. An incompatible change lacks either or both forward and backward compatibility. If a required change is incompatible, that change cannot be introduced into any one computer system until all computer systems that participate in a distributed network have been changed to use the same class version. Additional information about compatible and incompatible changes affecting program objects in the Java programming language may be obtained from the document "version.doc.html" under the jdk-specification directory mentioned above, and from an article identified by jw-03-1998/jw-03-beans_p.html under the javaworld directory mentioned above.

Because changes to classes are generally incompatible, many known techniques for program object serialization automatically generate an identification of the class version that was in use at the time the program object was serialized. Examples of this technique are discussed in a web page under the base directory mentioned above. The subdirectory and name for this web page is jw-03-1998/jw-03-beans_p.html. This allows a program to check the version of the serialized program object against the current version of the class used to define new instances of objects. If the versions are not the same, an error or some form of program exception can be raised to alert the application program to the potential incompatibility.

If a change is known to be compatible, known techniques allow a class designer to override the automatic version identification feature by forcing the serialization process to generate the same version identification for a new class version that was generated for an earlier class version. This technique allows programs using different but compatible class versions to share serial information representing serialized program objects for that class. Unfortunately, no known technique allows programs using different and incompatible versions to share serialized information.

DISCLOSURE OF INVENTION

It is an object of the present invention to provide for the serialization and deserialization of a program object in a manner that permits programs to share serialized representations of program objects that are instances of incompatible versions of a class.

According to one aspect of the present invention, a method serializes a program object that is an instantiation of an object class by obtaining a version identification of the program object, and generating serialized information conveying a representation of the program object that is determined as a function of the object class and the version identification.

According to another aspect of the present invention, a method deserialize serialized information conveying a representation of a program object that is an instantiation of an object class by obtaining from the serialized information the object class and a version identification of the program object, and establishing values from the, serialized information for one or more properties of the object, wherein the values for the one or more properties are established as a function of the object class and the version identification.

These aspects of the present invention be implemented by an apparatus that is adapted to carry out the methods. They may also be implemented by a program of instructions conveyed by a medium readable by a device such as a computer system that can execute the programs of instructions.

According to yet another aspect of the present invention, a medium readable by a device conveys serialized information representing one or more program objects that are instantiations of an object class that comprises an indication of the number of program objects represented by the serialized information, an indication of the object class name, and for each respective program object represented by the serialized information, a version identification of the respective program object and a respective value for one or more properties of the respective program object.

According to a further aspect of the present invention, a medium readable by a device conveys one or more programs of instructions for execution by the device to perform a method for serializing or for deserializing a program object that is an instantiation of a program class. The one or more programs of instructions comprise a definition of the object class that includes a method for obtaining a version identification of a respective program object, and a definition of an object-descriptor class that includes a method for identifying one or more properties of the respective program object that are to be serialized or deserialized.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

A. Overview

1. Implementation

Figure 1:
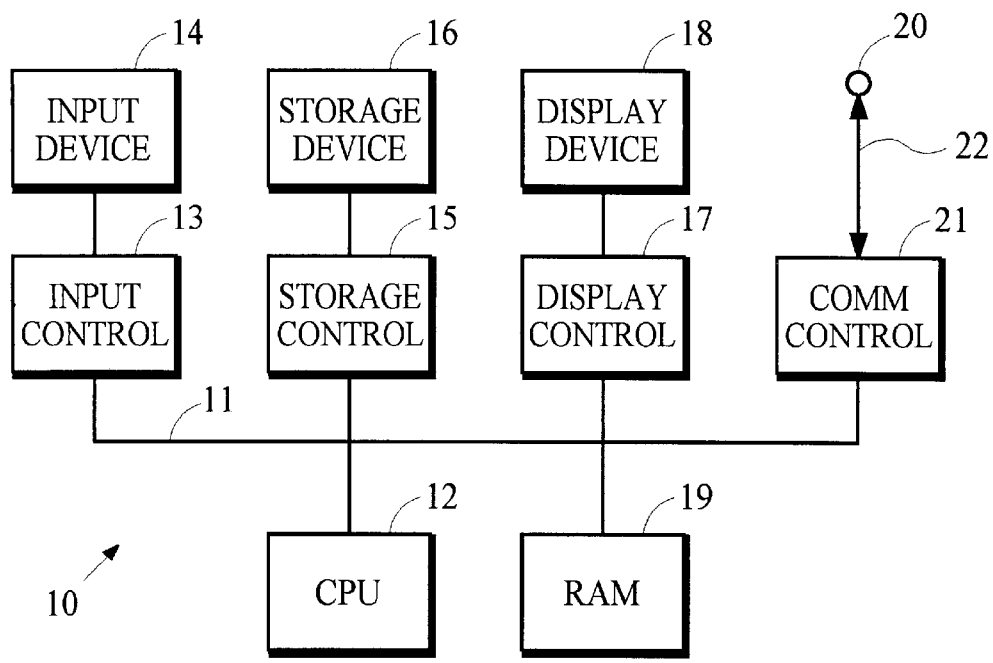
FIG. 1 is a block diagram of a computer system that may be used to carry out various aspects of the present invention.

The present invention may be implemented in a wide variety of ways including software in a personal computer system. FIG. 1 is a block diagram of computer system 10 that may be used to implement various aspects of the present invention. CPU 12 provides computing resources. Input control 13 represents an interface to input device 14 such as a keyboard or mouse. RAM 19 is system random access memory (RAM). Storage control 15 represents an interface to storage device 16 that includes a storage medium such as magnetic tape or disk, or an optical medium. The storage medium may be used to record programs of instructions for operating systems, utilities and applications, and may include embodiments of programs that implement various aspects of the present invention. Display control 17 provides an interface to display device 18. Communication control 21 represents an induce to communication channel 22 that connects to communication facility 20. Communication facility 20 may be essentially any facility such as a network, switch, or point-to-point communication path that allows computer system 10 to communicate with other devices.

In the embodiment shown, all major system components connect to bus 11, which may represent more than one physical bus. For example, some personal computers incorporate only one bus that conforms to the so called Industry Standard Architecture (ISA) or some variant of ISA. Other computers incorporate an additional bus such as a higher bandwidth bus conforming to some bus standard such as the PCI local bus standard. A bus architecture is not required to practice the present invention.

The features required to practice various aspects of the present invention can be performed by components that are implemented in a wide variety of ways including discrete logic components, one or more ASICs and/or program-controlled processors. The manner in which these components are implemented is not important to the present invention. For example, the operations required to practice the present invention can be implemented in a computer system such as computer system 10 by programs of instructions that are stored in storage device 16, copied into RAM 19 and executed by CPU 12.

Such software may be conveyed by a variety machine readable media including magnetic tape, magnetic disk, optical disc, and baseband or modulated communication paths throughout the spectrum including from supersonic to ultraviolet frequencies. Various aspects can also be implemented in various components of computer system 10 by processing circuitry such as ASICs, general-purpose integrated circuits, microprocessors controlled by programs embodied in various forms of read-only memory (ROM) or RAM, and other techniques.

2. Distributed Use of Serial Information

Figure 2:
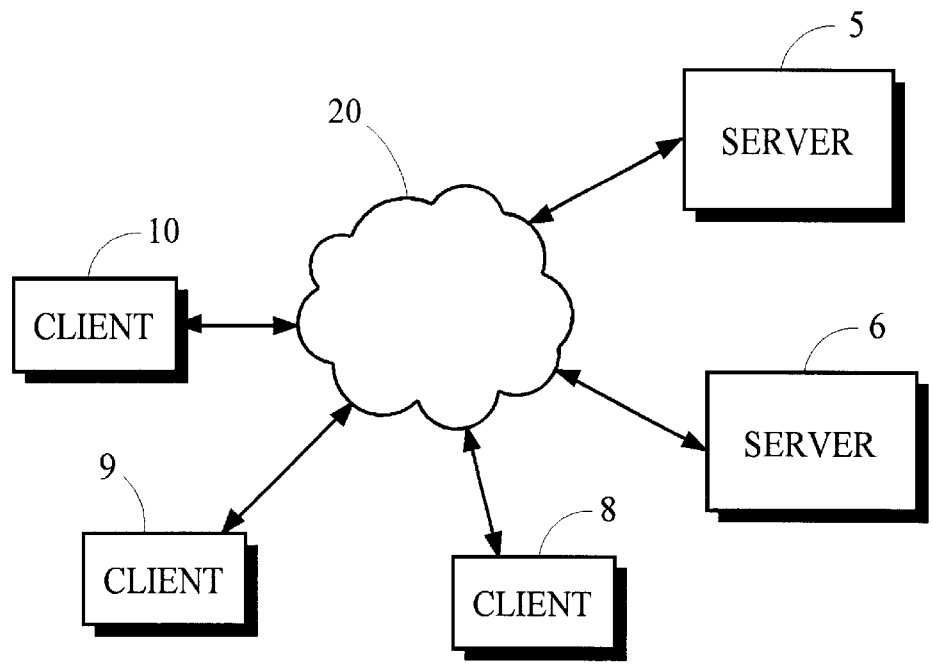
FIG. 2 is a block diagram of several computer systems interconnected by a communication facility such as a network.

FIG. 2 is a block diagram of several computer systems interconnected by communication facility 20 in the form of a network such as the Internet. In the particular embodiment shown, computer systems 8, 9 and 10 act as clients that can interact through the network with one or more servers 5, 6. This particular embodiment is shown merely as an example of a way in which computer systems may communicate with one another. No particular feature of this embodiment is important to the present invention.

A device such as computer system 10 may carry out various aspects of the present invention by writing serial information to, or reading serial information from, a storage medium such as that included in storage device 16 or a communication path such as that provided by communication facility 20. This serial information is used to represent one or more program objects, allowing program objects that are created at one particular time and place to be recreated at another time and/or place. This feature allows application processing to be distributed in time and/or place.

As used herein, the term "serial information" refers to information that may be recorded or conveyed in some serial manner; however, this information may be recorded or conveyed in essentially any form. For example, the "serial information" may be composed of informational elements such as bytes, the binary bits of which may be recorded or conveyed in parallel fashion.

In the embodiment shown in FIG. 2, for example, the present invention can be used to distribute the processing required to carry out a particular application by allowing computer system 10 to utilize the resources of other computer systems connected to communication facility 20. This may be accomplished by having computer system 10 generate serial information representing one or more program objects and sending that serial information to another computer system such as client 8. Server 5 and/or 6 may be used to facilitate the transfer of serial information between computer systems. An application executing on client 8 may create counterpart program objects to the one or more program objects that had existed on computer system 10 from the serial information received from communication facility 20, and perform tasks that are appropriate for the resources available to client 8. The performance of these tasks may modify one or more program objects, which can be conveyed by serial information generated by client 8. This serial information can be passed to another computer system for subsequent processing.

In a similar manner, a single computer system may distribute processing in time by generating serial information representing one or more program objects and writing that serial information to storage device 16. Subsequently, an application can create counterpart program objects from the serial information that can be read from storage device 16.

This mechanism works well enough until changes affecting the class structure or definition of the program objects are introduced into one or more applications. Changes in the class structure may be needed to correct errors or to add desirable new features for these applications. The ability to make such changes to an application that executes in a particular computer system is often hindered by a need to preserve compatibility of program objects between applications that execute in multiple computer systems. Compatibility is required so that these distributed applications can share serial information that represents these program objects. The present invention overcomes this difficulty by providing a unique "version" identification for each change in the program-object definition and by providing serialization and deserialization features that can adapt to the particular version of the program object that is to be serialized or deserialized.

B. Serialization

Figure 3:
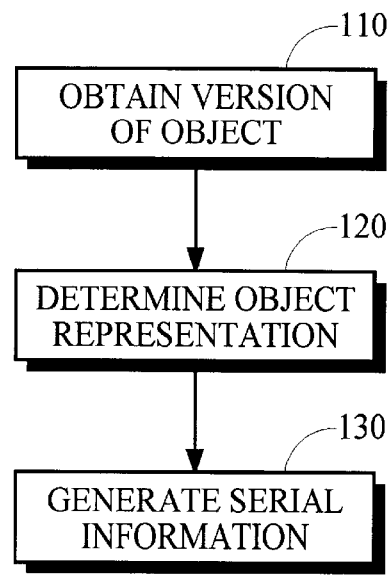
FIG. 3 illustrates a basic process for generating serial information according represent a program object according to the version of the program object.

FIG. 3 represents steps in a basic version-adaptive process for generating serial information that represents a program object according to the version of the program object. In this particular process, step 110 obtains the version of the program object, step 120 determines a representation of the program object according to the version, and step 130 generates serial information that conveys this representation. This particular process may be implemented in a variety of ways; however, in preferred implementations, program objects to be serialized must be instances of a class that defines various features facilitating the serialization process. Such classes are deemed to be "serializable" classes.

Figure 4:
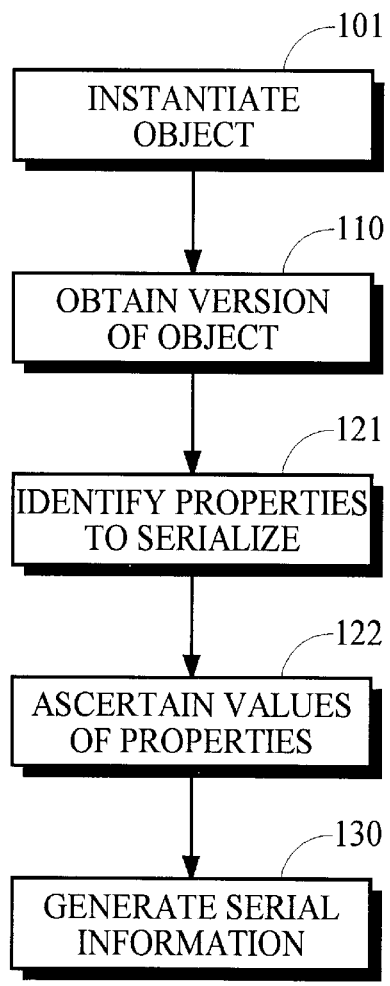
FIG. 4 illustrates one particular implementation of the basic process shown in FIG. 3.

FIG. 4 provides additional detail for one particular implementation of this basic serialization process. In this particular implementation, the class of a program object to be serialized defines a method for obtaining the version of the program object. Step 101 instantiates a program object of this class and step 110 invokes the appropriate method to obtain an identification of the program object version. Step 121 identifies the properties for this program object version that should be included in the serialized representation of the program object. This may be implemented in a variety of ways including, for example, a method of the program object to be serialized, a method of a program object in another class that is related in some manner to the class of the program object to be serialized, or a database of properties. In any case, an implementation of a process that determines the properties to serialize may be considered a function of the program object class and version. Step 122 ascertains the value of each property to serialize and step 130 generates serial information that conveys the program object class and version, and a representation of each respective property that was identified in steps 121 and 122.

Figure 7:
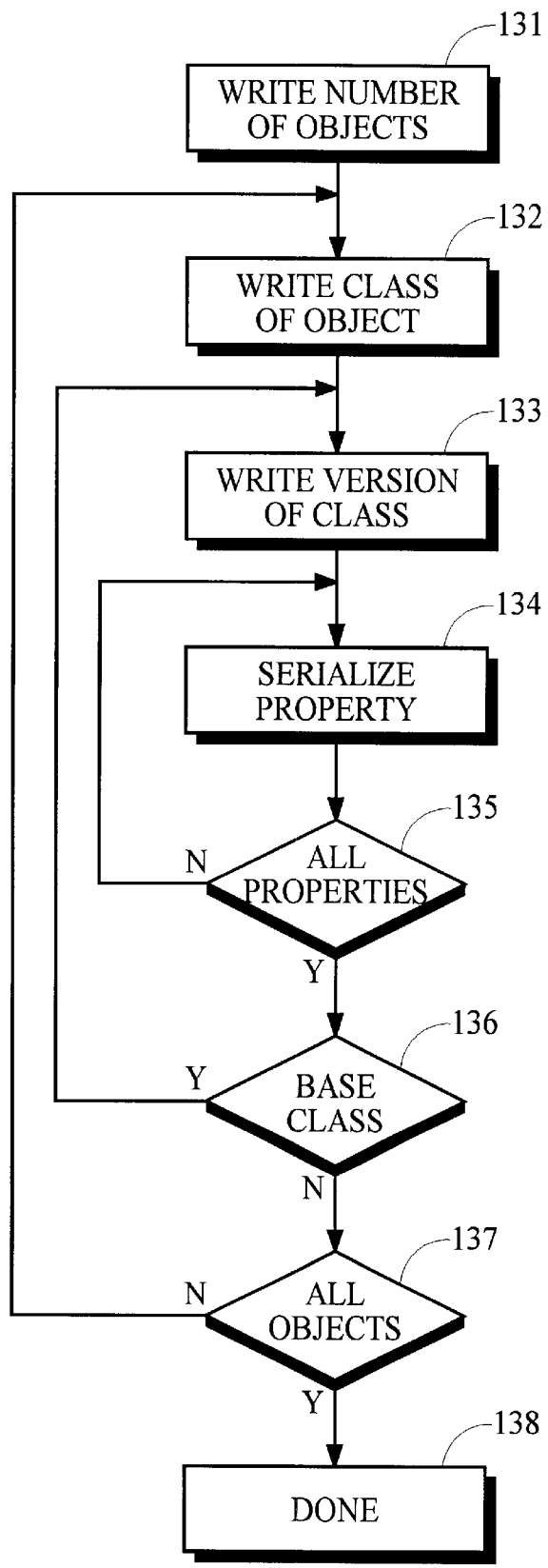
FIG. 7 illustrates the organization of one process that may be used to generate serial information representing one or more program objects.

FIG. 7 illustrates the organization of one process that may be used to generate serial information representing one or more program objects. According to this process, step 131 writes the number of program objects to serialize into a serial stream of information. For each respective program object to serialize, step 132 writes into the serial information stream an identification of the class of the respective program object and step 133 writes an identification of the version of the respective program object.

For each respective property of the respective program object to be serialized, step 134 invokes the appropriate process to serialize the respective property. Step 134 may implement a recursive process to serialize program object properties that are themselves one or more serializable program objects. This feature is described in more detail below. Step 135 determines whether all properties for the respective program object have been serialized and, if not, the process returns to step 134 to serialize the next property.

Figure 9:
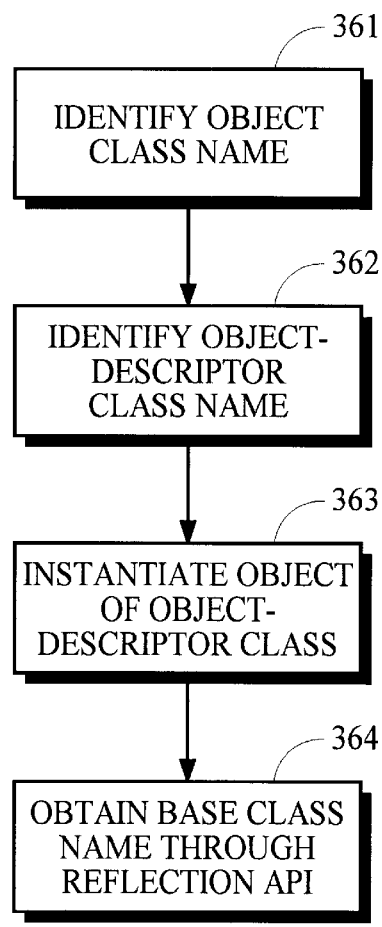
FIG. 9 illustrates a process that may be used to determine whether a program object class is derived from one or more base classes that are deemed to be serializable.

When all properties for the respective program object have been serialized, the process continues with step 136 that determines whether the class of the respective program object is derived from any base class that should be serialized. FIG. 9 illustrates steps in one process that may be used to implement step 136 in applications using program objects that conform to a "JavaBean™ API specification" such as version 1.01 that is included in the Java Development Kit (JDK) version 1.1 available from Sun Microsystems, Inc. Version 1.01 of this specification includes a specification for serializing a program component known as a "JavaBean" is provided in a document that is available from the Internet at URL http://java.sun.com/products/jdk/1.1/docs/guide/beans/index.html.

The implementation illustrated in FIG. 9 utilizes a feature of the Java programming language known as reflection. Step 361 invokes a method of the program object to obtain the name of the class of which the program object is an instance. Step 362 identifies the class name of an object-descriptor class that is associated with the class of the program object to serialize. In a preferred implementation, the class name of the object-descriptor class is derived from the class name of the program object in some manner such as, for example, appending the string "Descriptor" to the class name. In this example, the object-descriptor class name for the class "Widget" is "WidgetDescriptor". Step 363 instantiates an object of the object-descriptor class and step 364 invokes a method of this object that is provided by the Java reflection application programming interface (API) to obtain the name of the base class from which this object-descriptor class is derived. This implementation is described in more detail below.

If this object-descriptor class is derived from an object-descriptor base class, the process continues with step 133 that writes to the serial information stream an identification of the version pertaining to the base class. The process continues by serializing the appropriate properties of that base class. This process iterates until step 136 determines that no further base classes remain, at which time step 137 determines whether any further program objects remain to be serialized. If so, the process continues with step 132 for the next respective program object. Otherwise, the process concludes with step 138.

Figure 11:
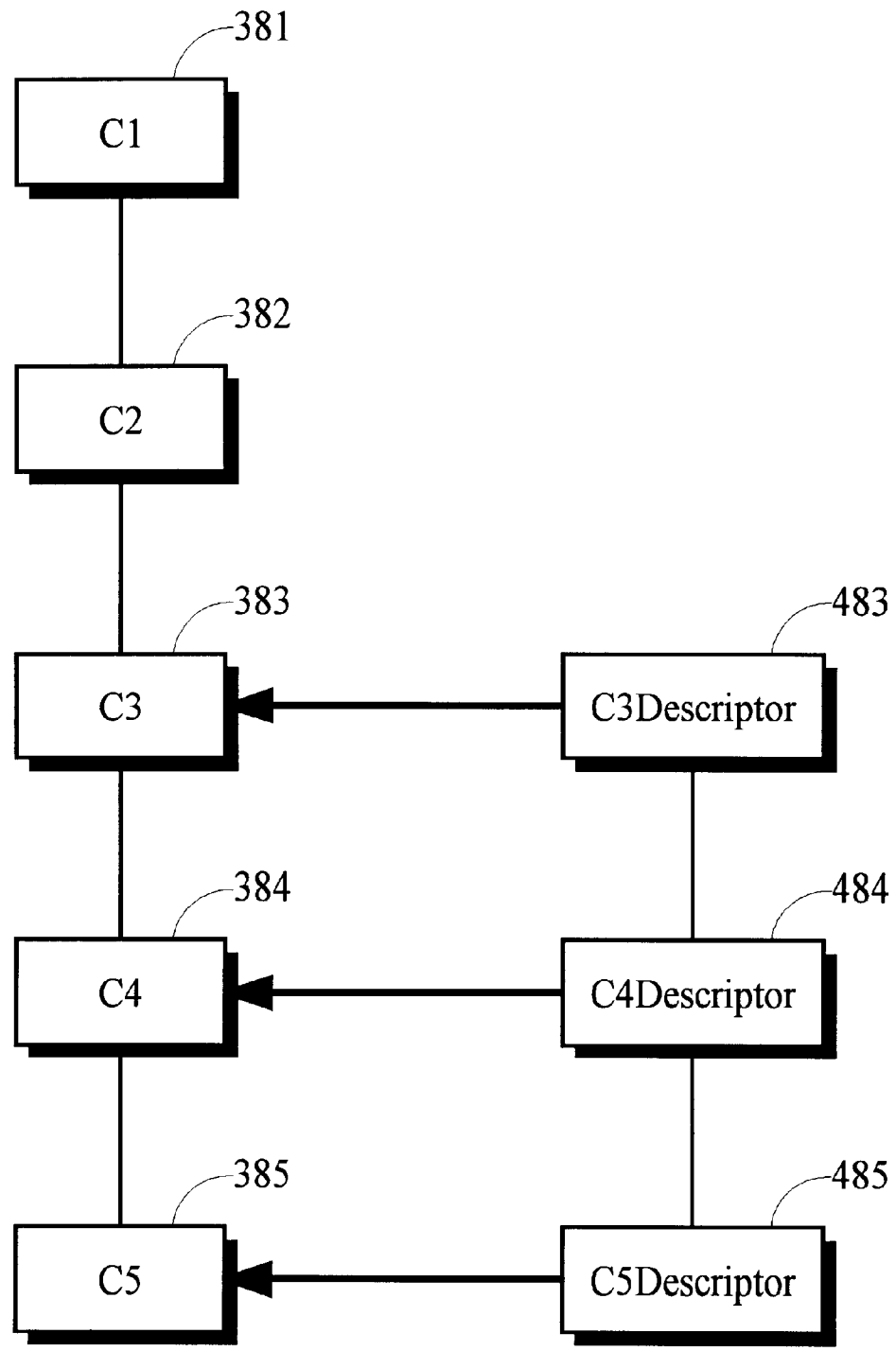
FIG. 11 illustrates a relationship between a hierarchy of derived program object classes and a hierarchy of related object-descriptor classes according to one embodiment of the present invention.

The relationship between a hierarchy of derived program object classes and a hierarchy of related object-descriptor classes is illustrated in FIG. 11. Program object classes C1 through C5 are represented by boxes 381 through 385, respectively, and object-descriptor classes C3Descriptor, C4Descriptor and C5Descriptor are represented by boxes 483 through 485, respectively. Class C5 is derived from class C4, which in turn is derived from class C3. In the example shown, class C3 is the highest program object class that is deemed to be XSerializable. The designation XSerializable in this particular implementation indicates the instances of a program object class can be serialized because the class implements features that facilitate the serialization of an object. Class C5Descriptor is an object-descriptor class that is derived from class C4Descriptor, which in turn is derived from class C3Descriptor. Each of these object-descriptor classes implement methods that can be invoked to obtain descriptive information about a respective program object class. This information may be used to serialize program objects for a respective class.

For example, the methods of an object of the object-descriptor class C4Descriptor may be invoked to obtain a list of the properties for the C4 class that are to be serialized. For implementation in the Java programming language, features of the Java reflection mechanism may be used by methods in the object-descriptor class to obtain this information. Because class C3 is the highest program object class that is XSerializable, no counterpart object-descriptor classes are defined for the higher program object classes C2 and C1.

C. Serial Information Format

In principle, the serial information may be arranged in essentially any format. No particular format is important to the present invention. A schematic illustration of the contents of serial information stream 300 generated according to the processes described above is illustrated in FIG. 10. According to this illustrated format, segment 301 provides an indication of the number of program objects represented by information in the stream, segments 302 and 303 provide an indication of the class name and version of the first program object represented in the stream, respectively, and segment 304 conveys serial information representing one or more properties of the first program object.

If the class of the first program object is derived from a base class that is serialized, segments 305 and 306 represent the version and properties of the base class. If this base class is derived from one or more additional base classes that are serialized, additional pairs of segments are used to convey information for the version and properties of each base class.

If more than one program object is represented by serial information stream 300, the representation of the second program object begins with segment 307 that provides an indication of the class name for the second program object. Additional segments convey information for this second program object and any subsequent program objects in the same manner as information is conveyed in segments 302 to 306 for the first program object.

Figure 10:
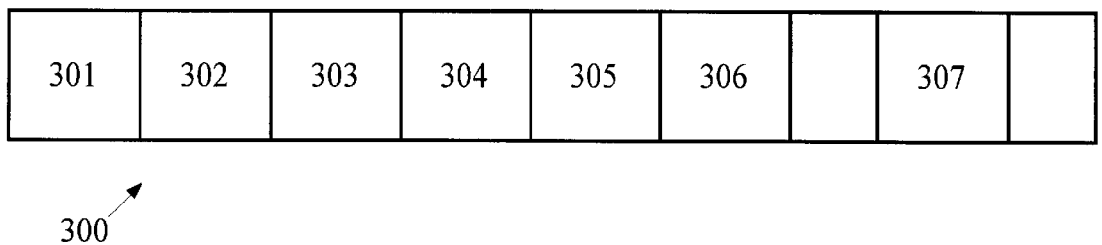
FIG. 10 is a schematic illustration of the contents of a serial information stream that may be generated by a serialization process according to the present invention.

Segments such as segment 304 that convey information representing one or more serialized properties may be divided into units of information as necessary. For example, information in segments representing multiple properties may be divided into a respective unit for each property. For properties that are themselves serializable objects, a unit may be further divided into segments. For example, if segment 304 conveys information representing multiple serializable objects, the information in this segment may be divided according to the format of segments 301 to 307 as illustrated in FIG. 10.

D. Deserialization

Figure 5:
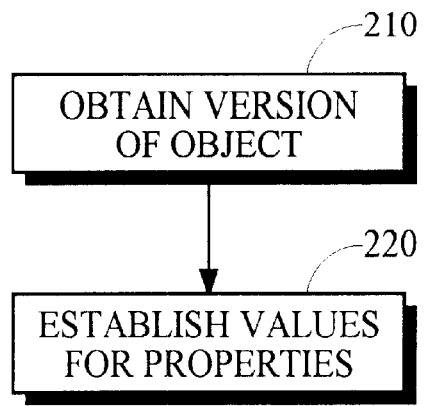
FIG. 5 illustrates a basic process for creating a program object from serial information according to the version of the program object.

FIG. 5 represents steps in a basic process for creating a program object for a particular version of a class from serial information that represents a program object for a possibly different version of that class. In this particular process, step 210 reads the serial information to obtain the version of the program object represented by the serial information, and step 220 establishes values for properties of the program object according to the version of the class represented in the serial information and according to the version of the class for which a program object is to be created. This particular process may be implemented in a variety of ways; however, in preferred implementations, program objects to be deserialized must be instances of a class deemed to be serializable because that class defines various features facilitating the deserialization process.

Figure 6:
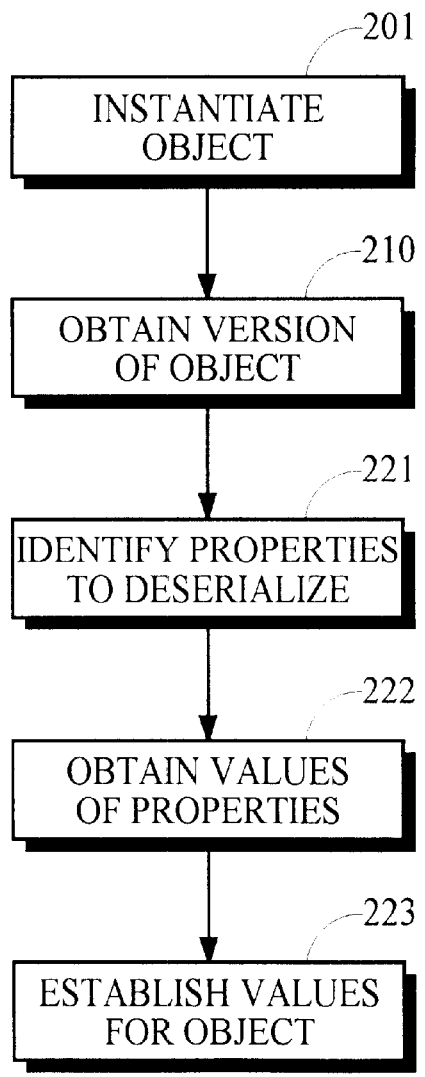
FIG. 6 illustrates one particular implementation of the basic process shown in FIG. 5.

FIG. 6 provides additional detail for one particular implementation of this basic deserialization process. In this implementation, step 201 instantiates a program object before step 210 reads the serial information to obtain an identification of the program object version that is represented by the serial information. In alternative implementations, an instance of the program object may be created in a subsequent step Step 221 identifies the properties for this program object version that are included in the serial information. This may be implemented in a variety of ways including, for example, a method of the program object to be deserialized, a method of a program object in a class that is related in some manner to the class of the program object to be deserialized, or a database of properties. In any case, an implementation of a process that determines the properties to deserialize may be considered a function of the program object class and version. Step 222 obtains the value of one or more properties from the serial information and step 223 establishes these values for the corresponding properties of the newly created instance of the program object.

Figure 8:
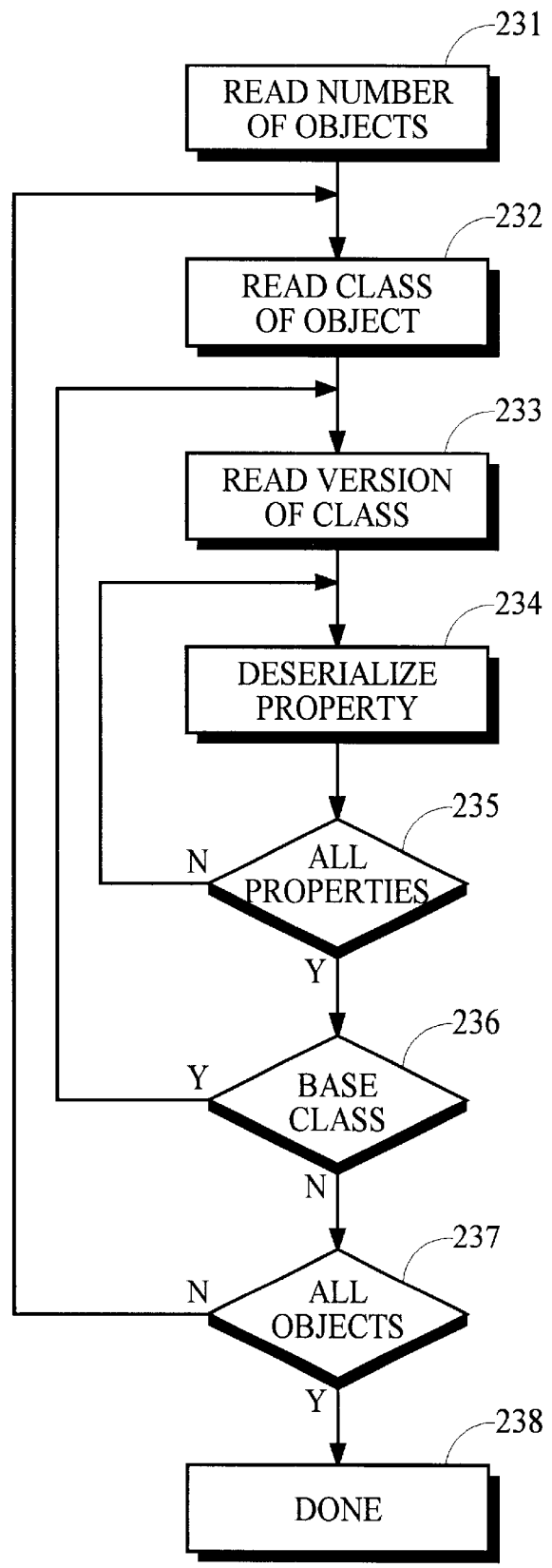
FIG. 8 illustrates the organization of one process that may be used to read and process serial information representing one or more program object.

FIG. 8 illustrates the organization of one process that may be used to read and process serial information representing one or more program objects. According to this process, step 231 reads the serial information to obtain the number of program objects that are represented in the serial information. For each respective program object to deserialize, step 232 reads from the serial information an identification of the class of the respective program object and step 233 reads an identification of the version of the respective program object.

For each respective property of the respective program object to deserialize, step 234 invokes the appropriate process to deserialize the respective property. Step 234 may implement a recursive process to deserialize program object properties that are themselves one or more deserializable program objects. This feature is described in more detail below. Step 235 determines whether all properties for the respective program object have been deserialized and, if not, the process returns to step 234 to deserialize the next property.

When all properties for the respective program object have been deserialized, the process continues with step 236 that determines whether the class of the respective program object is derived from any base class that should be deserialized. FIG. 9 illustrates steps in one process that may be used to implement step 236 in applications using program objects that conform to the Java Object Serialization Specification mentioned above. This particular implementation, which is described above, utilizes a feature of the Java programming language known as reflection.

If this class is derived from a base class, the process continues with step 233 that reads from the serial information an identification of the version pertaining to the base class. The process continues by deserializing the appropriate properties of that base class. This process iterates until step 236 determines that no further base classes remain, at which time step 237 determines whether any further program objects remain to be deserialized. If so, the process continues with step 232 for the next respective program object. Otherwise, the process concludes with step 238.

E. Implementations

1. Serialization a) High-Level Procedure

Implementations of various aspects of the processes discussed above are shown below in several program fragments. These program fragment are expressed in pseudocode that includes syntactical features of the Java programming language. The program fragments provided herein are not intended to be suitable for compilation into a practical embodiment but are provided to show a few considerations for possible implementations. For example, these program fragments do not include checks for error conditions and exceptions that would be required in practical embodiments. Furthermore, although more particular mention is made of implementations that conform to various Java conventions and specifications, the present invention may be implemented by essentially any programming language; however, the Java programming language provides features such as the reflection API that facilitate the particular implementation discussed below.

The following program fragment implements the procedure serializeObjects that may be called to serialize one or more program objects.

```
public void serializeObjects(ObjectOutputStream out, Vector objects) {
    int nObjects = 0;
    Object [ ] objArry = new Object[objects.size( )];
    objects.copyInto(objArry);
    for (int i = 0; i < objArry.length; i++) {
        Object o = objArry[i];
        if (o instance of XSerializable)
            nObjects++;
    }
    out.writeInt(nObjects); // Write the objects
    for (int i = 0; i < objArry.length; i++) {
        Object o = objArry[i];
        if (o instance of XSerializable)
            serializeObject(out, (XSerializable)o);
}
```

In this implementation, procedure serializeObjects receives an array objects that identifies the one or more program objects to serialize, and receives a reference out that identifies a serial stream into which the serialized representation is to be written. The procedure uses the variable nObjects to count the number of objects represented in array objects that can be serialized. As mentioned above, the designation XSerializable in this particular implementation indicates a program object can be serialized because the program object belongs to a class that implements features that facilitate the serialization of an object. The object count nObjects is written into the serial stream out. A for-loop in the procedure iteratively calls procedure serializeObject to serialize each program object identified in the object array that is designated as being XSerializable.

b) Low-Level Procedure

The following program fragment implements the procedure serializeObject that is called by the serializeObjects procedure to serialize a program object. This procedure serializes specific properties of a program object, including properties of any base classes from which the program object's class may be derived. A property may be a single entity such as an integer, or it may be an array of entities. If a property itself is a serializable program object or an array of serializable program objects, one or more recursive calls are made to serializeObject to serialize these program objects.

```
private void serializeObject(ObjectOutputStream out, XSerializable obj) {
    String className = obj.getclass().getName();
    ObjectDescriptor desc =
        (ObjectDescriptor)Class.forName(className + "Descriptor").newInstance();
    Vector temp = new Vector();         // Go up descriptor class hierarchy
    temp.addElement(desc.getClass());
    Class c = desc.getClass();
    while ((c = c.getSuperclass()) != null)
        temp.addElement(c);
    out.writeUTF(className);            // Write class name
    Class [] descriptors = new Class[temp.size()];
    temp.copyInto(descriptors);
    for (int i = 0; 1 < descriptors.length; i++) {        // For each descriptor class . . .
        Object descObj = descriptors[i].newInstance();
        ObjectDescriptor descriptor = (ObjectDescriptor)descObj;
        Class targetClass = Class.forName(descriptor.getClassName());
        Object targetObj = targetClass.newInstance();
        if (targetObj instanceof XSerializable) {
            float version = ((XSerializable)targetObj).getXClassVersion();
            out.writeFloat(version);    // Write version of object
            PropertyDescriptor[] props = descriptor.getProperties(version);
            for (int j = 0; j < props.length; j++) {
                // Use reflection to read property of object to serialize
                String funcName = "get" +
                    Character.toUpperCase(props[j].name.charAt(0)) +
                                            props[j].name.substring(1);
                Class [] args = new Class[0];
                Method m = targetClass.getMethod(funcName, args);
                if(m != null) {
                    Object [] params = new Object[0];
                    Object retVal = m.invoke(obj, params);
                    if (retVal instanceof XSerializable)      // Write property
                        this.serializeObject(out, (XSerializable)retVal);
                    else if (retVal instanceof XSerializableArray) {
                        XSerializable [] data =
                                (XSerializableArray)retVal).getObjects();
                        if (data != null) {            // Write length and objects
                            out.writeInt(data.length);
                            for (int h = 0; h < data.length; h++)
                                this.serializeObject(out, data[h]);
                        }
                        else
                            out.writeInt(0);      // Write zero length
                    }
                    else if (retVal instanceof ByteArrayWrapper) {
                        byte [] data = ((ByteArrayWrapper)retVal).getBytes();
                        if(data != null) {
                            out.writeInt(data.length);    // Write length of byte array
                            out.write(data);
                        }
                        else
                            out.writeInt(0);      // Write zero length
                    }
                    else if (retVal instanceof IntArrayWrapper) {
                        int [] data = ((IntArrayWrapper)retVal).getInts();
                        if(data != null) {         // Write length and int array
                            out.writeInt(data.length);
                            for (int h = 0; h < data.length; h++)
                                out.writeInt(data[h]);
                        }
                        else
                            out.writeInt(0);      // Write zero length
                    }
                    else
                        out.writeObject(retVal);       // Write object
                }
            }
        }
    }
}
```

In this implementation, procedure serializeObject receives a reference obj to a serializable object and a reference out that identifies a serial stream into which the serialized representation is to be written. The procedure obtains the name of the class for the object and writes the class name into the serial stream out. The procedure also builds an array descriptors of classes. The first element of the array is the class of the object-descriptor pertaining to the program object to be serialized. Subsequent entries in the array, if any, are the base classes from which the class of the object-descriptor is derived.

The procedure continues with a for-loop that iterates through the descriptors array. For each descriptor class in the array, a respective object-descriptor object for that class is instantiated as descriptor and used to identify the target class of the program object that is described by the respective object-descriptor object. For example, the target class of the first object-descriptor object instantiated from the array descriptors is the class of the program object obj to be serialized. If an object of this target class is deemed to be XSerializable, the procedure continues by obtaining an identification of the version for the target class and writing the version identification into the serial stream out. The method getProperties of the object-descriptor object is then invoked to obtain an array props in which each element describes a property to be serialized. Because the getProperties method is a function of the target class version and the procedure that implements the method may vary for each respective target class, the process that identifies the properties to serialize may be considered to be a function of both the target class and the version of the target class.

The procedure continues with a for-loop that iterates through the props array. For each property descriptor in the array, the reflection mechanism of Java is used to obtain the corresponding property itself If the property itself is designated XSerializable, a recursive call is made to the procedure serializeObject to serialize this object. If the property is an array of elements that are designated XSerializable, an array data is constructed for the elements, the length of the array is written into the serial stream out, and a recursive call is made to serializeObject for each element in the array. If the property is a byte array or an integer array, the length of the array and a representation for each element in the array are written into the serial stream out. Otherwise, a representation of the property itself is written into the serial stream out.

2. Deserialization a) High-Level Procedure

The following program fragment implements the procedure deserializeObjects that may be called to deserialize one or more program objects.

```
public Vector deserializeObjects(ObjectInputStream in) {
    Vector objects = new Vector();
    int nObjects = in.readInt(); // Read no. of serialized objects
    for (int i = 0; i < nObjects; i++) {// Read each object
        Object o = deserializeObject(in);
        if(o != null)
            objects.add.Element(o);
    }
}
```

In this implementation, procedure deserializeObjects receives a reference in that identifies a serial stream from which a serialized representation of one or more program objects is to be deserialized. The procedure reads into variable nObjects the number of objects represented in the serial stream. A for-loop in the procedure iteratively calls procedure deserializeObject to deserialize each program object that is represented in the serial stream.

b) Low-Level Procedure

The following program fragment implements the procedure deserializeObject that is called by the deserializeObjects procedure to deserialize a program object. This procedure deserializes specific properties of a program object, including properties of any base classes from which the program object's class may be derived. A property may be a single entity such as an integer, or it may be an array of entities. If a property itself is a program object or an array of program objects, one or more recursive calls are made to deserializeObject to deserialize these program objects.

```
private Object deserializeObject(ObjectInputStream in) {
    Object obj = null;
    String className = in.readUTF();    // Read object class name
        // Get object descriptor for class
    ObjectDescriptor desc =
        (ObjectDescriptor)Class.forName(className + "Descriptor").newInstance();
    Class objClass = Class.forName(desc.getClassName());
    obj = objClass.newInstance();
        // Go up descriptor class hierarchy
    Vector temp = new Vector();
    temp.addElement(desc.getClass());
    Class c = desc.getClass();
    while ((c = c.getSuperclass()) != null)
        temp.addElement(c);
    Class [] descriptors = new Class[temp.size()];
    temp copyInto(descriptors);
    for (int i = 0; i < descriptors.length; i++) { // For each descriptor . . .
        Class d = descriptors[i];
        Object theObj = d.newInstance();
        float version = in.readFloat();    // Read version of object
        ObjectDescriptor obj Desc = (ObjectDescriptor)theObj;
        PropertyDescriptor[] props = objDesc.getProperties(version);
        Class [] args = new Class[1];
        for (int j = 0; j < props.length; j++) {
            Object propVal = null;
            if (isXSerializable(props[1].type))
                propVal = deserializeObject(in);
            else if (props[j].type.getName() == "XSerializableArray") {
                int length = in.readInt();     // Read length of byte array
                XSerializable[] data = new XSerializable[length];
                for (int h = 0; h < length; h++)
                    data[h] = (XSerializable)deserializeObject(in);
                propVal = new XSerializableArray(data);
            }
```

```
            else if(props[1].type.getName() == "ByteArrayWrapper") {
                int length = in.readInt();      // Read length of byte array
                byte[] data = new byte[length];
                in.readFully(data, 0, length);
                propVal = new ByteArrayWrapper(data);
            }
            else if(props[j].type.getName() == "IntArrayWrapper") {
                int length = in.readInt();      // Read length of byte array
                int[] data = new int[length];
                for (int h = 0; h < length; h++)
                    data[h] = in.readInt();
                propVal = new IntArrayWrapper(data);
            }
            else
                propVal = in.readObject();
            args[0] = props[j].type;    // Invoke method to set property
            String funcName = "set" +
                Character.toUpperCase(props[j].name.charAt(0)) +
                                props[j].name.substring(1);
            Method m = objClass.getMethod(funcName, args);
            if (m != null) {
                Object [] params = new Object[1];
                params[0] = propVal;
                m.invoke(obj, params);
            }
        }
    }
    return obj;
}
```

In this implementation, procedure deserializeObject receives a reference in that identifies a serial stream from which a serialized representation of a program object is to be deserialized. The procedure reads the name of the class for the object from the serial stream in. The procedure also builds an array descriptors of object-descriptor classes. The first element of the array is the class of the object-descriptor pertaining to the class that was read from the serial stream. Subsequent entries in the array, if any, are the base classes from which the class of the object-descriptor is derived.

The procedure continues with a for-loop that iterates through the descriptors array. For each descriptor class in the array, a respective version identification is read from the serial stream in, a respective object-descriptor object for that class is instantiated as objDesc, and a respective target program object to be deserialized is instantiated as theObj. The getProperties method of the object-descriptor object objDesc is invoked to obtain an array props in which each element describes a property that is represented in the serial stream and is to be deserialized. This method is a function of the respective version identification read from the serial stream in. As explained above, the determination of the properties to be deserialized may be considered to be a function of both target object class and version.

The procedure continues with a for-loop that iterates through the props array to deserialize each respective property. If the property itself is designated XSerializable, a recursive call is made to the procedure deserializeObject to deserialize this object. If the property is an array of elements that are designated XSerializable, the length of the array is read from serial stream in, an array data is constructed, and a recursive call is made to deserializeObject to deserialize each property into a respective element of array data. If the property is a byte array or an integer array, the length of the array is read from the serial stream in, an array data is constructed, and each property is read from the serial stream and placed into a respective element of array data. For each type of property discussed so far, the representation of the property that is obtained from the serial stream in is placed into an object named prop Val. If the type of property is not any of the types mentioned above, the value of the property is read from serial stream out and placed directly into variable prop Val. Methods that are appropriate for the program object that is being deserialized are then invoked to establish the program object property based on the representation available in prop Val.

3. Other Considerations a) Testing XSeriaizable

The following program fragment implements the procedure isXSerializable that is used by the program fragments shown above to determine whether a particular class is deemed to be XSerializable.

```
private boolean isXSerializable(Class c) {
    Class [] interfaces = c.getInterfaces();
    for (int i = 0; i < interfaces.length; i++) {
        if (interfaces[i].getName() == "XSerializable")
            return true;
    }
    Class superClass = c;
    while ((superClass = superClass.getSuperclass()) != null) {
        interfaces = superClass.getInterfaces();
        for (int i = 0; i < interfaces.length; i++) {
            if (interfaces[i].getName() "XSerializable")
                return true;
        }
    }
    return false;
}
```

In this implementation, procedure isXSerializable receives a class c and determines whether objects that are instantiations of the class are deemed to be XSerializable. If class c itself implements an interface that has a particular name as shown, the class is deemed to be XSerializable. If not, each base class from which class c is derived is tested to determine whether any of the base classes implement this same interface. If any base class does implement this interface, class c is deemed to be XSerializable. Otherwise, class c is not deemed to be XSerializable.

b) Serialization Kit

The program fragments shown above and any required properties may be conveniently implemented as methods of a special class referred to herein as a kit. The following program fragment illustrated how this can be done.

```
public class XSerializationKit {// Class that (de)serializes
    serializable objects public XSerializationKito) {
    }
    // Properties and methods of the kit . . .
}
``` c) Serializable Program Object Class

The following program fragments illustrate how an XSerializable class may be defined according to the implementations described above. The first example shows a version 1.0 class definition.

```
public class Widget implements XSerializable {
    private static Float _ver = 1.0f;
    private String _name ="";
    public Float getXClassVersion( ) {
        return _ver;
    }
    public void setName(String name) {
        _name = name;
    }
}
The next example shows a version 1.1 class definition.
public class Widget implements XSerializable {
    private static Float _ver = 1.1f;
    private String _name = "";
    private Color _color = "";
    public Float getXClassVersion( ) {
        return _ver;
    }
    public void setName(String name) {
        _name = name;
    }
    public void setColor(Color color) {
        _color = color;
    }
}
```

In these implementations, the properties _name and _color and the methods setName and setColor are arbitrary. The methods are used in examples discussed below.

An XSerializable class may extend another XSerializable base class. It may also include or imbed a property that refers to an instance of an XSerializable class.

Arrays of primitive variable types such as "Byte" and "Integer" may be implemented as XSerializable structures in a variety of ways. An example of an implementation that is consistent with the implementations discussed above is presented in the following program fragment. This fragment defines two wrappers for Byte and Integer arrays.

```
public class ArrayWrapper implements XSerializable {
    private static Float _ver = 1.0f;
    Byte byteArray;
    Int [] intArray;
    public ArrayWrapper {
    }
    public Float getXClassVersion( ) {
        return _ver;
    }
    public void setByteArray(ByteArrayWrapper wrapper) {
        byteArray = wrapper.getBytes( );
    }
    public ByteArrayWrapper getByteArray( ) {
        return new ByteArrayWrapper(byteArray);
    }
    public void setIntArray(IntArrayWrapper wrapper) {
        intArray = wrapper.getInts( );
    }
    public IntArrayWrapper getIntArray( ) {
        return new IntArrayWrapper(intArray);
    }
}
``` d) Object-Descriptor Class

The following program fragment illustrates how an object-descriptor class may be defined according to the implementations described above.

```
public class WidgetDescriptor implements ObjectDescriptor {
    private String targetClass = "X.Widget";
    public WidgetDescriptor () {
    }
    public String getClassName() {
        return targetClass;
    }
    public PropertyDescriptor [] getProperties(Float version) {
        PropertyDescriptor [] array = null;
        if (version == 1.0f) {
            array = new PropertyDescriptor[1];
            array[0] = new PropertyDescriptor("name", java.lang.String.TYPE);
        }
        else if (version == 1.1f) }
            array = new PropertyDescriptor[2];
            array[0] = new PropertyDescriptor("name", java.lang.String.TYPE);
            array[1] = new PropertyDescriptor("color", java.awt. Color.class);
        }
        return array;
    }
```

The following program fragment illustrates how an object-descriptor class may be defined for the ArrayWrapper class described above.

```
public class ArrayWrapperDescriptor implements ObjectDescriptor {
    private String targetClass = "ArrayWrapper";
    public ArrayWrapperDescriptor () {
    }
    public String getClassName() {
        return targetClass;
    }
    public PropertyDescriptor [] getProperties(Float version) {
        PropertyDescriptor [] array = null;
        if (version == 1.0f) {
            array = new PropertyDescriptor[2];
            array[0] = new PropertyDescriptor("ByteArray",
                    Class.forName("ByteArrayWrapper"));
            array[1] = new PropertyDescriptor("IntArray",
                    Class.forName("IntArrayWrapper"));
        }
        return array;
    }
}
``` e) Example Application

The following program fragment illustrates how an application program may use the serialization kit described above to serialize one or more program objects. In this example, two program object instances of version 1.0 of the Widget class is serialized into the test.ser file.

```
public class Example1 {
    public static void main(String [] args) {
        Widget widObj1 = new Widget( );
        Widget widObj2 = new Widget( );
        widObj1.setName("test1");
        widObj2.setName("test2");
        Vector vecObj = new Vector( );
        vecObj.addElement(widObj1);
        vecObj.addElement(widObj2);
        XSerializationKit kit = new XSerializationKit( );
        ObjectOutputStream out =
            new ObjectOutputStream(new FileOutputStream("test.ser"));
        kit.serializeObjects(out, vecObj); // Serialize the objects
        out.close( );
    }
}
```

The following program fragment illustrates how an application program may use the serialization kit described above to deserialize one or more program objects. In this example, two instances of the Widget class are deserialized from the test.ser file generated by the Example1 application discussed above. The Example2 application creates program objects that conform to version 1.1 of the Widget class, as shown by the last line in the program fragment that invokes the setColor method to set the color property of program object widObj1. As shown above, this property was added to version 1.1 of the Widget class definiton.

```
public class Example2 {
    public static void main(String [] args) {
        XSerializationKit kit = new XSerializationKit( );
        ObjectInputStream in =
            new ObjectInputStream(new FileInputStream("test.ser"));
        Vector vecObj = (Vector)kit.deserializeObjects(in);
        in.close( );
        Widget widObj1 = (Widget)vecObj[0];
        Widget widObj2 = (Widget)vecObj[1];
        widObj1.setColor(Color.red);
    }
}
```

What is claimed is:

1. A method for serializing a program object that is an instantiation of an object class, wherein the method comprises:

obtaining a version identification of the program object; and generating serialized information conveying a representation of the program object that is determined as a function of the object class and the version identification.

2. A method according to claim 1 wherein the representation of the object is determined by:

identifying one or more properties of the program object to be serialized, wherein the properties are identified according to the object class and the program object version identification;

ascertaining a value for each respective property of the program object to be serialized; and generating the representation of the object to include representations of a name of the object class, the version identification of the program object, and the value of each respective property to be serialized.

3. A method according to claim 2 wherein the one or more properties of the program object to be serialized are identified by invoking a procedure within an object-descriptor class that describes how instantiations of the object class are to be serialized, wherein the procedure is responsive to the version identification of the program object.

4. A method according to claim 3 wherein the object-descriptor class has a name that is derived from the name of the object class.

5. A method according to claim 3 wherein the program object and the object class conform to a JavaBean specification of a Java programming language.

6. A method according to claim 2 wherein the one or more properties of the program object to be serialized are identified by invoking a procedure that returns a list of property names that varies according to the object class and the version identification.

7. A method according to claim 6 wherein the procedure is a method of an object that is an instance of an object-descriptor class defining serializable characteristics of the program object to be serialized.

8. A method according to claim 2 wherein:

the version identification is obtained by invoking a method of the program object;

the one or more properties of the program object to be serialized are identified by invoking a method of an object-descriptor object that is a function of the object class and the program object version identification; and the serial information is generated by invoking a method of an output-stream object.

9. An apparatus for serializing a program object that is an instantiation of an object class, wherein the apparatus comprises:

random access memory; and processing circuitry coupled to the random access memory, wherein the processing circuitry obtains a version identification of the program object stored in the random access memory and generates serialized information conveying a representation of the program object that is determined as a function of the object class and the version identification.

10. An apparatus according to claim 9 wherein the representation of the object is determined by:

identifying one or more properties of the program object to be serialized, wherein the properties are identified according to the object class and the program object version identification;

ascertaining a value for each respective property of the program object to be serialized; and generating the representation of the object to include representations of a name of the object class, the version identification of the program object, and the value of each respective property to be serialized.

11. An apparatus according to claim 10 wherein the one or more properties of the program object to be serialized are identified by invoking a procedure within an object-descriptor interface that describes how instantiations of the object class are to be serialized, wherein the procedure is responsive to the version identification of the program object.

12. An apparatus according to claim 11 wherein the object-descriptor class has a name that is derived from the name of the object class.

13. An apparatus according to claim 11 wherein the program object and the object class conform to a JavaBean specification of a Java programming language.

14. An apparatus according to claim 10 wherein the one or more properties of the program object to be serialized are identified by invoking a procedure that returns a list of property names that varies according to the object class and the version identification.

15. An apparatus according to claim 14 wherein the procedure is a method of an object that is an instance of an object-descriptor class defining serializable characteristics of the program object to be serialized.

16. An apparatus according to claim 10 wherein:

the version identification is obtained by invoking a method of the program object;

the one or more properties of the program object to be serialized are identified by invoking a method of an object-descriptor object that is a function of the object class and the program object version identification; and the serial information is generated by invoking a method of an output-stream object.

17. A medium readable by a device and conveying a program of instructions for execution by the device to perform a method for serializing a program object that is an instantiation of an object class, wherein the method comprises:

obtaining a version identification of the program object; and generating serialized information conveying a representation of the program object that is determined as a function of the object class and the version identification.

18. A medium according to claim 17 wherein the representation of the object is determined by:

identifying one or more properties of the program object to be serialized, wherein the properties are identified according to the object class and the program object version identification;

ascertaining a value for each respective property of the program object to be serialized; and generating the representation of the object to include representations of a name of the object class, the version identification of the program object, and the value of each respective property to be serialized.

19. A medium according to claim 18 wherein the one or more properties of the program object to be serialized are identified by invoking a procedure within an object-descriptor class that describes how instantiations of the object class are to be serialized, wherein the procedure is responsive to the version identification of the, program object.

20. A medium according to claim 19 wherein the object-descriptor class has a name that is derived from the name of the object class.

21. A medium according to claim 19 wherein the program object and the object class conform to a JavaBean specification of a Java programming language.

22. A medium according to claim 18 wherein the one or more properties of the program object to be serialized are identified by invoking a procedure that returns a list of property names that varies according to the object class and the version identification.

23. A medium according to claim 22 wherein the procedure is a method of an object that is an instance of an object-descriptor class defining serializable characteristics of the program object to be serialized.

24. A medium according to claim 18 wherein:

the version identification is obtained by invoking a method of the program object;

the one or more properties of the program object to be serialized are identified by invoking a method of an object-descriptor object that is a function of the object class and the program object version identification; and the serial information is generated by invoking a method of an output-stream object.

25. A method for deserializing serialized information conveying a representation of a program object that is an instantiation of an object class, wherein the method comprises:

obtaining from the serialized information the object class and a version identification of the program object; and establishing values from the serialized information for one or more properties of the object, wherein the values for the one or more properties are established as a function of the object class and the version identification.

26. A method according to claim 25 wherein the values for the one or more property values are established by:

identifying one or more properties of the program object to be deserialized, wherein the properties are identified according to the object class and the program object version identification;

obtaining values from the serialized information for one or more respective properties of the program object to be deserialized; and establishing the values for the one or more properties of the program object in response to the values obtained from the serialized information.

27. A method according to claim 26 wherein the one or more properties to be deserialized are identified by invoking a procedure within an object-descriptor class that describes how instantiations of the object class are to be deserialized, wherein the procedure is responsive to the version identification of the program object.

28. A method according to claim 27 wherein the object-descriptor class has a name that is derived from the name of the object class.

29. A method according to claim 27 wherein the program object and the object class conform to a JavaBean specification of a Java programming language.

30. A method according to claim 26 wherein the one or more properties of the program object to be deserialized are identified by invoking a procedure that returns a list of property names that varies according to the object class and the version identification.

31. A method according to claim 30 wherein the procedure is a method of an object that is an instance of an object-descriptor class defining deserializable characteristics of the program object to be deserialized.

32. A method according to claim 26 wherein:
the object class and the version identification are obtained by invoking a method of an input-stream object; and
the one or more properties of the program object to be deserialized are identified by invoking a method of an object-descriptor object that is a function of the object class and the program object version identification.

33. An apparatus for deserializing serialized information conveying a representation of a program object that is an instantiation of an object class, wherein the apparatus comprises:
random access memory; and
processing circuitry coupled to the random access memory, wherein the processing circuitry obtains from the serialized information the object class and a version identification of the program object, and establishes in the random access memory values from the serialized information for one or more properties of the object, wherein the values for the one or more properties are established as a function of the object class and the version identification.

34. An apparatus according to claim 33 wherein the values for the one or more property values are established by:
identifying one or more properties of the program object to be deserialized, wherein the properties are identified according to the object class and the program object version identification;
obtaining values from the serialized information for one or more respective properties of the program object to be deserialized; and
establishing the values for the one or more properties of the program object in response to the values obtained from the serialized information.

35. An apparatus according to claim 34 wherein the one or more properties to be deserialized are identified by invoking a procedure within an object-descriptor class that describes how instantiations of the object class are to be deserialized, wherein the procedure is responsive to the version identification of the program object.

36. An apparatus according to claim 35 wherein the object-descriptor class has a name that is derived from the name of the object class.

37. An apparatus according to claim 35 wherein the program object and the object class conform to a JavaBean specification of a Java programming language.

38. An apparatus according to claim 34 wherein the one or more properties of the program object to be deserialized are identified by invoking a procedure that returns a list of property names that varies according to the object class and the version identification.

39. An apparatus according to claim 38 wherein the procedure is a method of an object that is an instance of an object-descriptor class defining deserializable characteristics of the program object to be deserialized.

40. An apparatus according to claim 34 wherein:
the object class and the version identification are obtained by invoking a method of an input-stream object; and
the one or more properties of the program object to be deserialized are identified by invoking a method of an object-descriptor object that is a function of the object class and the program object version identification.

41. A medium readable by a device and conveying a program of instructions for execution by the device to perform a method for deserializing serialized information conveying a representation of a program object that is an instantiation of an object class, wherein the method comprises:
obtaining from the serialized information the object class and a version identification of the program object; and
establishing values from the serialized information for one or more properties of the object, wherein the values for the one or more properties are established as a function of the object class and the version identification.

42. A medium according to claim 41 wherein the values for the one or more property values are established by:
identifying one or more properties of the program object to be deserialized, wherein the properties are identified according to the object class and the program object version identification;
obtaining values from the serialized information for one or more respective properties of the program object to be deserialized; and
establishing the values for the one or more properties of the program object in response to the values obtained from the serialized information.

43. A medium according to claim 42 wherein the one or more properties to be deserialized are identified by invoking a procedure within an object-descriptor class that describes how instantiations of the object class are to be deserialized, wherein the procedure is responsive to the version identification of the program object.

44. A medium according to claim 43 wherein the object-descriptor class has a name that is derived from the name of the object class.

45. A medium according to claim 43 wherein the program object and the object class conform to a JavaBean specification of a Java programming language.

46. A medium according to claim 42 wherein the one or more properties of the program object to be deserialized are identified by invoking a procedure that returns a list of property names that varies according to the object class and the version identification.

47. A medium according to claim 46 wherein the procedure is a method of an object that is an instance of an object-descriptor class defining deserializable characteristics of the program object to be deserialized.

48. A medium according to claim 42 wherein:
the object class and the version identification are obtained by invoking a method of an input-stream object; and
the one or more properties of the program object to be deserialized are identified by invoking a method of an object-descriptor object that is a function of the object class and the program object version identification.

49. A medium readable by a device and conveying one or more programs of instructions for execution by the device to perform a method for serializing or for deserializing a program object that is an instantiation of a program class, wherein the one or more programs of instructions comprise:
a definition of the object class that includes a method for obtaining a version identification of a respective program object; and
a definition of an object-descriptor class that includes a method for identifying one or more properties of the respective program object that are to be serialized or deserialized.

50. A medium according to claim 49 wherein the definition of the object-descriptor class includes a method that returns an indication of names for the one or more properties of the respective program object that are to be serialized or deserialized.

51. A medium according to claim 49 wherein the definition of the object-descriptor class includes a method that returns a name for the object class.

52. A medium according to claim 49 wherein the property-descriptor class includes a method for obtaining an indication of property types for the one or more properties of the respective program object that are to be serialized or deserialized.

* * * * *

UNITED STATES PATENT AND TRADEMARK OFFICE
CERTIFICATE OF CORRECTION

PATENT NO.    : 6,477,701 B1
DATED         : November 5, 2002
INVENTOR(S)   : Horst Heistermann et al.

It is certified that error appears in the above-identified patent and that said Letters Patent is hereby corrected as shown below:

Column 21,
Line 14, please change "interface" to -- class --.

Signed and Sealed this

Twenty-ninth Day of April, 2003

JAMES E. ROGAN
*Director of the United States Patent and Trademark Office*